United States Patent
Lin

(10) Patent No.: US 7,196,695 B2
(45) Date of Patent: Mar. 27, 2007

(54) FLAT PANEL DISPLAY IN WHICH A DIGITIZER IS INTEGRATED

(75) Inventor: Che-Li Lin, Taipei (TW)

(73) Assignee: AU Optronics Corp., Hsinchu (TW)

( * ) Notice: Subject to any disclaimer, the term of this patent is extended or adjusted under 35 U.S.C. 154(b) by 343 days.

(21) Appl. No.: 10/624,478

(22) Filed: Jul. 23, 2003

(65) Prior Publication Data
US 2004/0130538 A1    Jul. 8, 2004

(30) Foreign Application Priority Data
Jul. 30, 2002    (TW) .............................. 91117083 A

(51) Int. Cl.
*G09G 5/00*    (2006.01)
(52) U.S. Cl. ..................... 345/173; 178/18.01; 349/57; 349/61
(58) Field of Classification Search ............ 178/18.03, 178/18.09, 18.11, 18.01, 20.01; 345/175, 345/173, 102, 104; 349/1.62, 65, 67, 62, 349/12, 57, 61
See application file for complete search history.

(56) References Cited

U.S. PATENT DOCUMENTS

| | | | |
|---|---|---|---|
| 6,215,476 B1 * | 4/2001 | Depew et al. .............. | 345/173 |
| 6,339,418 B1 * | 1/2002 | Kitagawa .................... | 345/102 |
| 6,603,469 B1 * | 8/2003 | Gettemy et al. ............ | 345/211 |
| 6,756,970 B2 * | 6/2004 | Keely et al. ................ | 345/173 |
| 2001/0006369 A1 * | 7/2001 | Ely .............................. | 341/20 |
| 2002/0089492 A1 * | 7/2002 | Ahn et al. ................... | 345/173 |
| 2003/0201938 A1 * | 10/2003 | Dening et al. ....... | 343/700 MS |

* cited by examiner

*Primary Examiner*—Amr A. Awad
*Assistant Examiner*—Donna Lui
(74) *Attorney, Agent, or Firm*—Troxell Law Office PLLC

(57) ABSTRACT

A flat panel display comprises the following components. A display module has a lower glass substrate for fabricating thin film transistors, an upper glass substrate for fabricating a color filter, and a displaying molecule layer inserted between the lower glass substrate and the upper glass substrate. The lower glass substrate is connected electrically to a control circuit board via a flexible printed circuit board for driving the thin film transistors. And a backlight unit is fabricated beneath the display module and has a lightguide, a lamp disposed aside the lightguide to emit lights into the lightguide in the edgelight form, and a plurality of optical films disposed on the lightguide for scattering the lights emitted from the lightguide uniformly. The backlight unit comprises a sensor board disposed beneath the lightguide for receiving inputting signals from a signal stylus above the flat panel display. And the sensor board has a reflector surface layer for reflecting lights dispersed from a lower surface of the lightguide.

17 Claims, 2 Drawing Sheets

FLAT PANEL DISPLAY IN WHICH A DIGITIZER IS INTEGRATED

FIELD OF THE INVENTION

The present invention relates to a flat panel display (FPD) into which a digitizer is integrated, and more specifically, to a design of integrating the sensor board of the digitizer into a backlight unit and integrating the control board of the digitizer into the drive circuits of the flat panel display.

BACKGROUND OF THE INVENTION

With the advance of techniques for fabricating thin-film transistors, the flat panel displays (FPD) are widely applied in electrical products, such as PDAs, laptops, digital cameras, cell phones, etc. due to advantages as portability, non-radiation and lower power consumption. Especially when the manufacturers devote themselves to further research and improve the materials, processes and equipments, the qualities of FDP devices are promoted and the production costs thereof are reduced substantially.

In general, on these electronic products, such as PDAs or notebook, are assembled with keyboards for providing consumers to input data and orders. However, following the current design trend of the electronic products towards portable and practical, the keyboards occupied the part space of the electronic products usually hinder from the portability. Therefore, touch screens are introduced to some electronic products.

In the conventional touch screens, a touch panel is fabricated on a display to provide consumers for inputting data and orders by utilizing a hand-held stylus in conjunction with the touch screen display. However, because it is indispensable to fabricate the touch panel onto the outer surface of display, some light source is obstructed, and thus the image displaying efficiency is decreased. Even though the transparency of the touch panel in current products is promoted about 85%, for most electronic products with touch panels, the extra backlight sources are still required to provide enough illumination. And the transparency limitation of the touch panels also squander lots of electrical power.

For thoroughly solving the above problems, the display manufacturers introduce digitizers to substitute for the conventional touch screen. Please refer to FIG. 1, a liquid crystal display 10 integrated with a digitizer 40 is illustrated. The liquid crystal display 10 comprises a display module 20, a backlight unit 30 and the digitizer 40. The display module 20 has an upper glass substrate 22, a lower glass substrate 24, and a liquid crystal molecule layer inserted therebetween. On the upper glass substrate 22 an upper polarizer 26 is fabricated, and beneath the lower glass substrate 24 a lower polarizer 26 is fabricated. Specially, a printed circuit board assembly (PCB assembly) 27 is electrically connected to the lower glass substrate 24 via a flexible printed circuit board (FPC) 29 for driving the thin film transistors on the lower glass substrate 24. By using a timing control chip 25 fabricated on the PCB assembly 27, the thin film transistors can be switch on or off.

Besides, the backlight module 30 comprises a lightguide 32, optical films 34, a white sheet 36, a lamp 38 and a reflector cover 39. The lightguide 32 made of acrylics is applied to provide light propagating paths. Aside the lightguide 32 disposed the lamp 38 is applied to illuminate the lightguide 32 in the edgelight form. The lights entering from one side of the lightguide 32 can propagate therethrough to another side in the total reflection form. Aside the lamp 38 the reflector cover 39 is applied to prevent illumination from dissipating. The white sheet 36 is placed beneath the lightguide 32 to reflect the light dispersed from the lightguide 32. And the optical films 34 disposed on the lightguide 32 including some diffuser films and brightness enhancing films are introduced to make the light scattering more uniformly.

The digitizer 40 comprises a sensor board 42 and a control board 44. The sensor board 42 has the grid type of antenna arrays and is mounted underneath the backlight unit 30. When consumers utilize a hand-held stylus to select or input data above the display module 20, the sensor board 42 can receive the electromagnetic signals and transfer these signals to the control board 44 via a connecting bus 46. Then the control board 44 can decode these signals and communicate with the motherboard of the electronic product. On the control board 44 an ASIC chip 48 is fabricated for providing the above decoding and communicating functions.

It is noted that after assembling the display module 20 and the backlight unit 30, the FPC board 29 is wound around the sidewall of the backlight unit 30 to have the drive circuit board 27 attached to the lower surface of the backlight unit 30 for saving space. However, after integrating the digitizer 40 into the display, if the sensor board 42 is disposed under the drive circuit board 27, the electronic signals passing on the drive circuit board 27 will severely interfere with the signals received by the antenna arrays of the sensor board 42. Therefore, as shown in FIG. 2, in the current displays, the sensor board 42 is inserted between the drive circuit board 27 and the backlight unit 30, and which is screwed or taped to fasten onto the backlight unit 30 for preventing from the signal interference of the drive circuit board 27. However, after that, the thickness of the display is increasing, and thus it is indispensable to prolong the FPC board 29 for inserting the sensor board 42 between the drive circuit board 27 and the backlight unit 30.

SUMMARY OF THE INVENTION

The primal objective of the present invention is to provide a new design of integrating the sensor board of the digitizer into the backlight unit of the flat panel display.

Another objective of the present invention is to provide a design of fabricating the sensor board with a reflector surface layer, and thus the sensor board is capable of reflecting lights.

The further objective of the present invention is to provide one single control circuit board and one single control chip for simultaneous driving the thin film transistors of the display and decoding the signals received by the sensor board.

The present invention discloses a new flat panel display which comprises the following components. A lower glass substrate is used for fabricating thin film transistors. An upper glass substrate is used for fabricating a color filter. A liquid crystal molecule layer is disposed between the upper glass substrate and the lower glass substrate. Some optical films are disposed beneath the lower glass substrate for scattering lights uniformly. A lightguide is disposed beneath the optical films for providing the paths of lights propagating. A lamp is disposed aside the lightguide for emitting lights into the lightguide in the edgelight form. A sensor board is attached beneath the lightguide for receiving signals from a hand-held stylus above the flat panel display, wherein the sensor board has a reflector surface layer for reflecting lights dispersed from a lower surface of the lightguide. And a control circuit board is attached to a lower surface of the sensor board, and is connected electrically to the lower glass substrate via a flexible printed circuit board for driving the thin film transistors. The control circuit board is also connected to the sensor board via a connecting bus for decoding the signals received by the sensor board.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
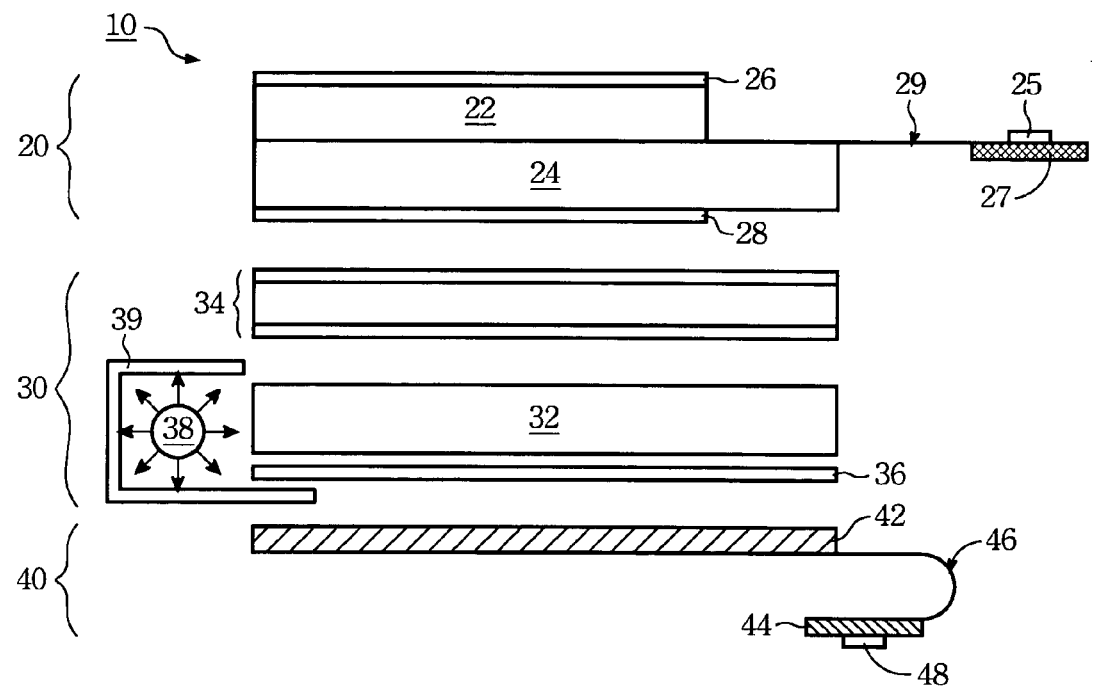
FIG. 1 illustrates the liquid crystal display with the digitizer in the prior art.
Figure 2:
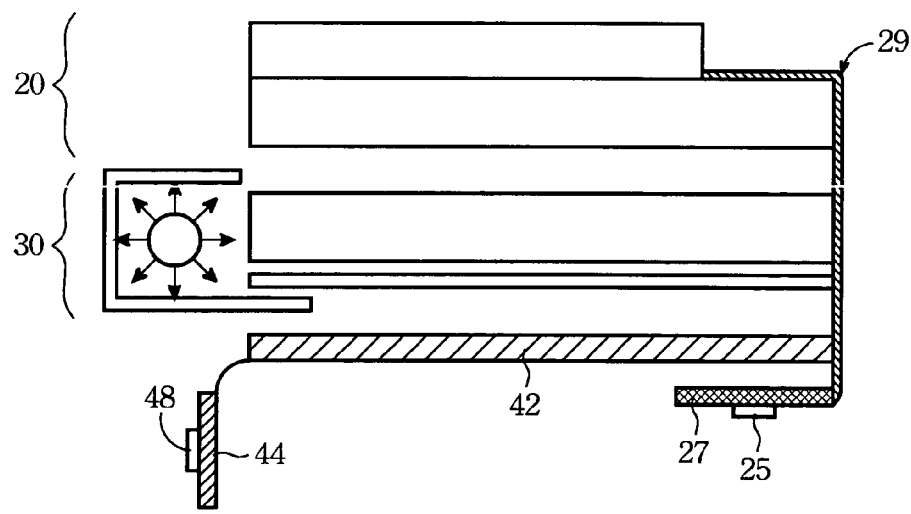
FIG. 2 illustrates the manner of fabricating the digitizer onto the liquid crystal display according to the prior art.
Figure 3:
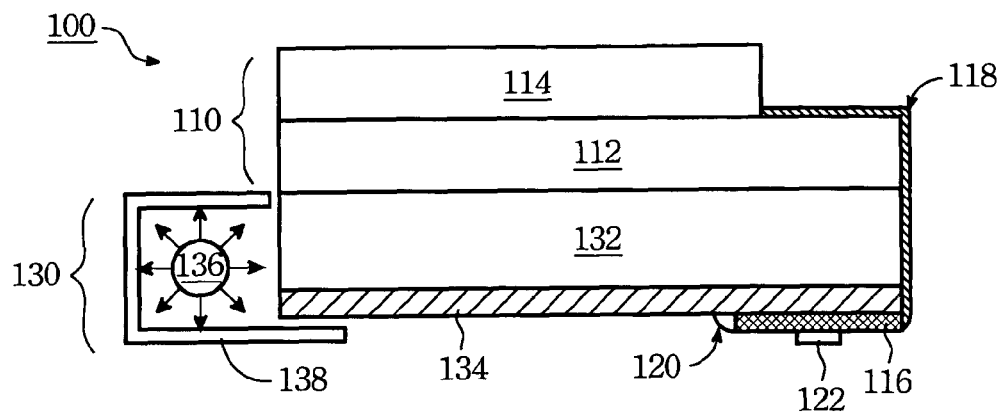
FIG. 3 illustrates the flat panel display in which a digitizer is integrated in the present invention.

Please refer to FIG. 3, a flat panel display (FPD) 100 in which a digitizer is integrated is illustrated. The flat panel display comprises a display module 110 and a backlight unit 130. The display module 110 is fabricated on a top surface of the backlight unit 130, and has the components of a lower glass substrate 112 for fabricating thin film transistors, an upper glass substrate 114 for fabricating a color filter, and a displaying molecule layer containing materials such as liquid crystal molecules (not illustrated) for forming images by the thin film transistors. In general, on the upper glass substrate 114 an upper polarizer plate (not shown) is fabricated, and similarly beneath the lower glass substrate 112 a lower polarizer plate (not shown) is fabricated for adjusting phases of lights and promoting the usage efficiency of lights.

Besides, the backlight unit 130 beneath the display module 110 comprises a lightguide 132, a sensor board 134, a lamp 136 and a reflector cover 138. The lightguide 132 is applied to provide lights propagating paths. And the lamp 136 aside the lightguide 132 is applied to emit lights into the lightguide 132 in the edgelight form. The lights entering the lightguide 132 can propagate therethrough in the total reflection form and emit uniformly from a top surface of the lightguide 132. The reflector cover 138 disposed around the lamp 136 is applied to reflect and concentrate lights for promoting the amount of lights entering the lightguide 132.

In general, on the lightguide 132 a plurality of optical films (not shown) are fabricated to make the lights emitted from the top surface of the lightguide scatter uniformly. When the backlight unit 130 is assembled with the display module 110, the optical films are attached to a lower surface of the display module 110. In a preferred embodiment, the optical films comprise upper diffuser films, brightness enhancing films, and lower diffuser films. The upper and lower diffuser films are used for scattering lights uniformly. And the brightness enhancing films, such as the BEFs made of prisms or the DBEFs (Dual Brightness Enhanced Film) made of polarizers, are used for condensing lights.

Furthermore, the sensor board 134 is attached to a lower surface of the lightguide 132 for receiving inputting signals from a hand-held stylus above the flat panel display. In a preferred embodiment, the sensor board has a thickness of 0.40~0.8 mm and comprises an antenna array layer and a reflector surface layer. The antenna array layer is made of FR4 or FPC materials and has a thickness of 0.2~0.4 mm for receiving electro-magnetic signals from the hand-held stylus. And the reflector surface layer has a thickness of 0.2~0.4 mm and can be formed on or beneath the antenna array layer basing process requirements to reflect the lights dispersed from the lower surface of said lightguide 132.

A control circuit board 116 is fabricated under the backlight unit 130 to control the thin film transistors on the lower glass substrate 112 and to decode the signals received by the sensor board 134. As shown as FIG. 3, the control circuit board 116 is mounted on a lower surface of the sensor board 134, and is connected to the lower glass substrate 112 for driving the thin film transistors thereon via a flexible printed circuit board 118. The flexible printed circuit board 118 connected to the lower glass substrate 112 is wound downward and around sidewalls of the lower glass substrate 112 and the backlight unit 130 to connect with the control circuit board 116. And the control circuit board 116 is also connected with the sensor board 134 via a connecting bus 120 for decoding the signals received by the sensor board 134.

It is noted that an integrated control chip 122 is mounted onto the control circuit board 116 for executing the functions of driving the thin film transistors and decoding the signals from the sensor board. Namely the integrated control chip 122 is introduced to provide timing control signals for driving and controlling the thin film transistors, and simultaneously to provide logical functions of decoding and delivering signals from the sensor board 134.

The flat panel display with a digitizer provided in the present invention has some advantages as follows:

First, because the sensor board of the digitizer is integrated into the backlight unit, the display device will have a small thickness than that in the prior art. And the material of the reflector surface layer will not affect the efficiency of receiving signals of the sensor board. So even though the sensor board is fabricated with the reflector surface layer, its capability of detecting the signals from the hand-held stylus can be still maintained.

Second, it is not required to use the screws or tapes to fasten the sensor board when it is assembled to the backlight unit. Therefore, in the later procedures of fabricating the control circuit board, the appearance of the display device will be more planar, and the reliability thereof will be more stable. And because the sensor board is fastened in the casing of the backlight unit, the joint compatibility between the sensor board and the display module is better. Especially, the displacement of the sensor board which is screwed or taped for fixing in the prior art can be effectively avoided by applying the design of the present invention effectively. Namely the alignment of the sensor board can be more accurate because the sensor board is disposed in the casing of the backlight unit.

Besides, the control board of the digitizer and the drive circuit board for driving the thin film transistors in the prior art are both integrated in one single control circuit board in the present invention. And similarly the ASIC chip and the timing control chip are both integrated into one single control chip. So no extra circuit board and connecting bus are used in the present invention, and thus the electronic products can be manufactured more portable and the prime cost can be further reduced.

Figure 4:
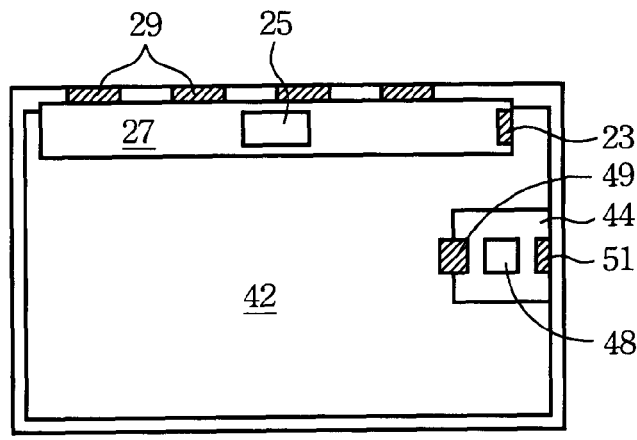
FIG. 4 illustrates the top view of the flat panel display with the digitizer according to the prior art.
Figure 5:
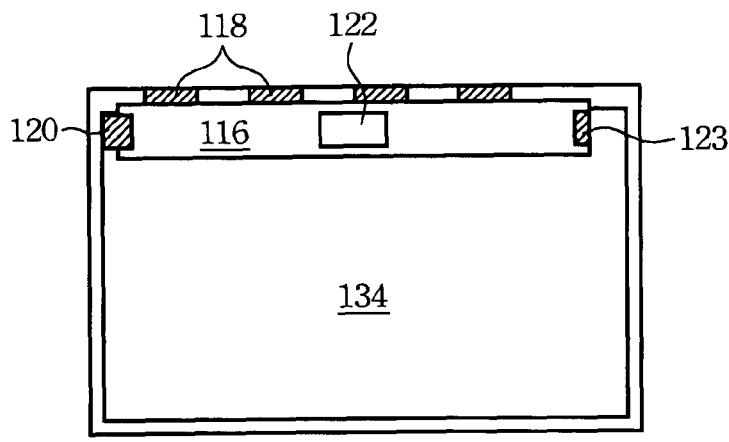
FIG. 5 illustrates the top view of the flat panel display with the digitizer according to the present invention.

Please refer to FIGS. 4 & 5, these FIGUREs illustrate the difference between of the conventional display and the new display of the present invention in their top views. In FIG.

4, a sensor board 42 is attached to a lower surface of the backlight unit by screws or tapes. And the above drive circuit board 27 and the control board 44 are fabricated on the sensor board 42. On the drive circuit board, a timing control chip 25 is mounted and connected to the thin film transistors in the display module via a flexible printed circuit board 29. And a connecting slot 23 is also fabricated on the drive circuit board for connecting to the system motherboard. Further, on the control board 44 fabricated is an ASIC chip which is connected to the sensor board 42 via a connecting bus 49 and connected to the system motherboard via another connecting bus 51.

Compared to the conventional flat panel display, in the top view of the flat panel display provided by the present invention as shown in FIG. 5, the sensor board 134 is fabricated in the casing of the backlight unit. Similarly, beneath the backlight unit a control circuit board 116 is fabricated and connected to the thin film transistors of the display module via the flexible printed circuit board 118. And because the control circuit board 116 is also applied to decode signal from the sensor board 134, one connecting bus 120 is introduced to connect the control circuit board 116 and the sensor board 134. Besides, as aforementioned, the integrated control chip 122 is mounted onto the control circuit board 116 to execute the functions of driving the thin film transistors and decoding the signals from the sensor board. And another connecting bus 123 is applied to connect the control circuit board 116 and the system motherboard.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar design.

What is claimed is:

1. A backlight unit for a flat panel display (FPD) having a plurality of thin film transistors comprising:
    a lightguide, providing light propagating paths;
    a lamp, disposed beside said lightguide to emit lights into said lightguide in an edgelight form, said lights emitted into said lightguide propagate therethrough in a total reflection form;
    optical films, disposed on said lightguide for scattering lights emitted from said lightguide uniformly;
    a sensor board, attached to a lower surface of said lightguide, comprising an antenna array layer and a reflector surface layer, wherein said antenna array layer is applied to receive inputting signals from a hand-held stylus, and said reflector surface layer is applied to reflect lights dispersed from said lower surface of said lightguide;
    a control circuit board, attached beneath said sensor board, connected electrically for driving said thin film transistors via a flexible printed circuit board, and connected to said sensor board via a connecting bus for decoding said signals received by said sensor board; and
    an integrated control chip fabricated on said control circuit board to provide timing control signals for driving said thin film transistors and executing a logical function of decoding signals from said sensor board.

2. The backlight unit of claim 1, further comprising a reflector cover disposed around said lamp to reflect and concentrate lights of said lamp into said lightguide.

3. The backlight unit of claim 1, wherein said optical films comprise diffuser films and brightness enhancing films for scattering lights emitted from said lightguide more uniformly.

4. The backlight unit of claim 1, wherein said optical films comprise upper diffuser films, brightness enhancing films and lower diffuser films.

5. The backlight unit of claim 1, wherein materials of said antenna array layer are chosen from a group of FR4 and FPC, and said antenna array layer has a thickness of 0.2~0.4 mm.

6. The backlight unit of claim 1, wherein said reflector surface layer has a thickness of 0.2~0.4 mm, and is disposed under said antenna array layer.

7. A flat panel display comprising:
    a display module, having a lower glass substrate for fabricating thin film transistors, an upper glass substrate for fabricating a color filter, and a displaying molecule layer inserted between said lower glass substrate and said upper glass substrate, wherein said lower glass substrate is connected electrically to an integrated control chip on one single control circuit board via a flexible printed circuit board for driving said thin film transistor; and
    a backlight unit, fabricated beneath said display module, having a lightguide, a lamp disposed aside said lightguide to emit lights into said lightguide in an edgelight form, and optical films disposed on said lightguide for scattering lights emitted from an upper surface of said lightguide uniformly;
    wherein said backlight unit comprises a sensor board attached to a lower surface of said lightguide for receiving inputting signals from a hand-held stylus above said flat panel display, wherein said sensor board has a reflector surface layer for reflecting lights dispersed from said lower surface of said lightguide;
    wherein said flexible printed circuit board is wound downward around a sidewall of said backlight unit to have said single control circuit board be attached beneath said backlight unit, wherein said single control circuit board is connected electrically to said sensor board via a connecting bus to decode signals received by said sensor board; and
    wherein said integrated control chip fabricated on said control circuit board to provide timing control signals for driving said thin film transistors and executing a logical function of decoding signals from said sensor board.

8. The flat panel display of claim 7, wherein said displaying molecule layer is made of liquid crystal molecules.

9. The flat panel display of claim 7, wherein said sensor board has a thickness of 0.40~0.8 mm and comprises an antenna array layer and said reflector surface layer.

10. The flat panel display of claim 9, wherein said antenna array layer has a thickness about 0.2~0.4 mm, and materials of said antenna array board is chosen from a group of FR4 and FPC.

11. The flat panel display of claim 9, wherein said reflector surface layer has a thickness of 0.2~0.4 mm and is fabricated on said antenna array layer.

12. The flat panel display of claim 9, wherein said reflector surface layer is fabricated beneath said antenna array layer.

13. A flat panel display comprising:
    a lower glass substrate, for fabricating thin film transistors;
    an upper glass substrate, for fabricating a color filter;

a liquid crystal molecule layer, disposed between said upper glass substrate and said lower glass substrate;

optical films, disposed beneath said lower glass substrate for scattering lights passing therethrough uniformly;

a lightguide, disposed beneath said optical films;

a lamp, disposed aside said lightguide for emitting lights into said lightguide in an edgelight form;

a sensor board, attached beneath said lightguide for receiving signals from a hand-held stylus above said flat panel display, wherein said sensor board has a reflector surface layer for reflecting lights dispersed from a lower surface of said lightguide;

one single control circuit board, attached beneath said sensor board, connected electrically to said lower glass substrate via a flexible printed circuit board for driving said thin film transistors, and connected to said sensor board via a connecting bus for decoding said signals received by said sensor board; and an integrated control chip fabricated on said control circuit board to provide timing control signals for driving said thin film transistors and executing a logical function of decoding signals from said sensor board.

14. The flat panel display of claim 13, wherein said sensor board has a thickness of 0.4~0.8 mm.

15. The flat panel display of claim 14, wherein said sensor board further comprises an antenna array layer with a thickness about 0.2~0.4 mm, and materials of said antenna array layer is chosen from a group of FR4 and FPC.

16. The flat panel display of claim 14, wherein said reflector surface layer has a thickness of 0.2~0.4 mm and is fabricated on said antenna array layer.

17. The flat panel display of claim 14, wherein said reflector surface layer is fabricated beneath said antenna array layer.

* * * * *